US009264986B2

(12) United States Patent
Homchaudhuri et al.

(10) Patent No.: US 9,264,986 B2
(45) Date of Patent: Feb. 16, 2016

(54) SYSTEM AND METHOD FOR REDUCING POWER CONSUMPTION IN A WIRELESS COMMUNICATION SYSTEM

(71) Applicant: QUALCOMM Incorporated, San Diego, CA (US)

(72) Inventors: Sandip Homchaudhuri, Santa Clara, CA (US); James S. Cho, Mountain View, CA (US); Fnu Rajkumar Samuel, San Jose, CA (US); Sarvesh Shrivastava, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 90 days.

(21) Appl. No.: 13/714,380

(22) Filed: Dec. 13, 2012

(65) Prior Publication Data

US 2013/0343250 A1   Dec. 26, 2013

Related U.S. Application Data

(60) Provisional application No. 61/664,125, filed on Jun. 25, 2012.

(51) Int. Cl.
*G08C 17/00* (2006.01)
*H04W 52/02* (2009.01)

(52) U.S. Cl.
CPC ...... *H04W 52/0203* (2013.01); *H04W 52/0251* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 6,496,869 B1 * | 12/2002 | Cheng | 709/250 |
| 2008/0267069 A1 * | 10/2008 | Thielman et al. | 370/235 |
| 2008/0293438 A1 * | 11/2008 | Harris | 455/458 |
| 2009/0125735 A1 * | 5/2009 | Zimmerman | 713/310 |
| 2009/0172434 A1 | 7/2009 | Kwa et al. | |
| 2009/0249103 A1 | 10/2009 | Jeyaseelan et al. | |
| 2010/0169684 A1 | 7/2010 | Jeyaseelan et al. | |
| 2011/0261814 A1 * | 10/2011 | Matthews et al. | 370/389 |
| 2011/0276816 A1 | 11/2011 | Cooper et al. | |
| 2011/0302626 A1 * | 12/2011 | Kwa et al. | 726/1 |
| 2012/0008642 A1 | 1/2012 | Katibian et al. | |
| 2012/0198248 A1 | 8/2012 | Jeyaseelan et al. | |
| 2012/0231747 A1 * | 9/2012 | Chen et al. | 455/68 |
| 2013/0019042 A1 * | 1/2013 | Ertugay et al. | 710/267 |
| 2014/0043979 A1 * | 2/2014 | Etemad et al. | 370/237 |

OTHER PUBLICATIONS

Intel, "Energy-Efficient Platforms White Paper: Designing Devices Using the New Power Management Extensions for Interconnects," Jul. 2009, pp. 1-38.
Wagh M., "PCI Express 3.0 Technology: Device Architecture Optimizations on Intel Platforms", IDF 2009, Intel Developers Form, pp. 1-33.
International Search Report and Written Opinion—PCT/US2013/047614—ISA/EPO—Feb. 10, 2014.

* cited by examiner

*Primary Examiner* — Edan Orgad
*Assistant Examiner* — Rebecca Song
(74) *Attorney, Agent, or Firm* — Bay Area Technology Law Group PC

(57) ABSTRACT

A wireless communication device having a root complex, a WLAN module, a power module and an interface linking the root complex and the WLAN module, wherein the root complex is configured to implement a power management policy based upon a latency tolerance value for the WLAN module and wherein the power module is configured to adjust the latency tolerance value based upon receive and transmit parameters of the WLAN module. The power module may be configured to adjust the latency tolerance value on a per-frame basis.

30 Claims, 9 Drawing Sheets

| BW | MCS Index | Modulation | Code Rate | $N_{SS}$ | $N_{BPSC}$ | $N_{SD}$ | $N_{SP}$ | $N_{CBPS}$ | $N_{DBPS}$ |
|---|---|---|---|---|---|---|---|---|---|
| 20 MHz | 0 | BPSK | 1/2 | 1 | 1 | 52 | 4 | 52 | 26 |
| 20 MHz | 1 | QPSK | 1/2 | 1 | 2 | 52 | 4 | 104 | 52 |
| 20 MHz | 2 | QPSK | 3/4 | 1 | 2 | 52 | 4 | 104 | 78 |
| 20 MHz | 3 | 16-QAM | 1/2 | 1 | 4 | 52 | 4 | 208 | 104 |
| 20 MHz | 4 | 16-QAM | 3/4 | 1 | 4 | 52 | 4 | 208 | 156 |
| 20 MHz | 5 | 64-QAM | 2/3 | 1 | 6 | 52 | 4 | 312 | 208 |
| 20 MHz | 6 | 64-QAM | 3/4 | 1 | 6 | 52 | 4 | 312 | 234 |
| 20 MHz | 7 | 64-QAM | 5/6 | 1 | 6 | 52 | 4 | 312 | 260 |
| 20 MHz | 8 | 256-QAM | 3/4 | 1 | 8 | 52 | 4 | 416 | 312 |
| 20 MHz | 9 | 256-QAM | 5/6 | 1 | 8 | 52 | 4 | 416 | 346.6667 |
| 40 MHz | 0 | BPSK | 1/2 | 1 | 1 | 108 | 6 | 108 | 54 |
| 40 MHz | 1 | QPSK | 1/2 | 1 | 2 | 108 | 6 | 216 | 108 |
| 40 MHz | 2 | QPSK | 3/4 | 1 | 2 | 108 | 6 | 216 | 162 |
| 40 MHz | 3 | 16-QAM | 1/2 | 1 | 4 | 108 | 6 | 432 | 216 |
| 40 MHz | 4 | 16-QAM | 3/4 | 1 | 4 | 108 | 6 | 432 | 324 |
| 40 MHz | 5 | 64-QAM | 2/3 | 1 | 6 | 108 | 6 | 648 | 432 |
| 40 MHz | 6 | 64-QAM | 3/4 | 1 | 6 | 108 | 6 | 648 | 486 |
| 40 MHz | 7 | 64-QAM | 5/6 | 1 | 6 | 108 | 6 | 648 | 540 |
| 40 MHz | 8 | 256-QAM | 3/4 | 1 | 8 | 108 | 6 | 864 | 648 |
| 40 MHz | 9 | 256-QAM | 5/6 | 1 | 8 | 108 | 6 | 864 | 720 |
| 80 MHz | 0 | BPSK | 1/2 | 1 | 1 | 234 | 8 | 234 | 117 |
| 80 MHz | 1 | QPSK | 1/2 | 1 | 2 | 234 | 8 | 468 | 234 |
| 80 MHz | 2 | QPSK | 3/4 | 1 | 2 | 234 | 8 | 468 | 351 |
| 80 MHz | 3 | 16-QAM | 1/2 | 1 | 4 | 234 | 8 | 936 | 468 |
| 80 MHz | 4 | 16-QAM | 3/4 | 1 | 4 | 234 | 8 | 936 | 702 |
| 80 MHz | 5 | 64-QAM | 2/3 | 1 | 6 | 234 | 8 | 1404 | 936 |
| 80 MHz | 6 | 64-QAM | 3/4 | 1 | 6 | 234 | 8 | 1404 | 1053 |
| 80 MHz | 7 | 64-QAM | 5/6 | 1 | 6 | 234 | 8 | 1404 | 1170 |
| 80 MHz | 8 | 256-QAM | 3/4 | 1 | 8 | 234 | 8 | 1872 | 1404 |
| 80 MHz | 9 | 256-QAM | 5/6 | 1 | 8 | 234 | 8 | 1872 | 1560 |
| 160 MHz | 0 | BPSK | 1/2 | 1 | 1 | 468 | 16 | 468 | 234 |
| 160 MHz | 1 | QPSK | 1/2 | 1 | 2 | 468 | 16 | 936 | 468 |
| 160 MHz | 2 | QPSK | 3/4 | 1 | 2 | 468 | 16 | 936 | 702 |
| 160 MHz | 3 | 16-QAM | 1/2 | 1 | 4 | 468 | 16 | 1872 | 936 |
| 160 MHz | 4 | 16-QAM | 3/4 | 1 | 4 | 468 | 16 | 1872 | 1404 |
| 160 MHz | 5 | 64-QAM | 2/3 | 1 | 6 | 468 | 16 | 2808 | 1872 |
| 160 MHz | 6 | 64-QAM | 3/4 | 1 | 6 | 468 | 16 | 2808 | 2106 |
| 160 MHz | 7 | 64-QAM | 5/6 | 1 | 6 | 468 | 16 | 2808 | 2340 |
| 160 MHz | 8 | 256-QAM | 3/4 | 1 | 8 | 468 | 16 | 3744 | 2808 |
| 160 MHz | 9 | 256-QAM | 5/6 | 1 | 8 | 468 | 16 | 3744 | 3120 |

| Platform Power State | Memory Access Latency | Interrupt Response Latency | Break Even Idle Time | Energy Efficiency Sweet Spot | Platform Power Targets | Battery Life |
|---|---|---|---|---|---|---|
| 1 (C2 Popup) | <15µs | <10µs | | | P1=P2+1W | 7h |
| 2 (C3) | ~15µs | ~20µs | ~100µs | | P2=P3+400mW | 8h45m |
| 3 (C6) | ~50µs | ~70µs | ~200µs | ~1ms | P3=P4+300mW | 9h43m |
| 4 (C7) | ~60µs | ~80µs | ~250µs | ~2ms | P4=P5+250mW | 43h45m |
| 5 (C8) | ~110µs | ~130µs | ~250µs | ~100ms | P5=P6+25mW | 63h38m |
| 6 (C9) | ~150µs | ~250µs | ~250µs | ~100ms | P6=P7+25mW | 66h40m |
| 7 (C10) | ~1.3ms | ~10ms | ~10ms | ~100ms | P7=~500mW | 70h |

FIG. 13

SYSTEM AND METHOD FOR REDUCING POWER CONSUMPTION IN A WIRELESS COMMUNICATION SYSTEM

RELATED APPLICATIONS

The present application claims priority of pending provisional patent application Ser. No. 61/664,125 filed Jun. 25, 2012.

FIELD OF THE PRESENT INVENTION

This disclosure generally relates to wireless communication systems and more specifically to systems and methods for reducing power consumption by facilitating frequent excursions to low power states during performance-oriented modes of a wireless device.

BACKGROUND OF THE INVENTION

Wireless networks are increasingly employed to provide various communication functions including voice, video, packet data, messaging and the like. A wireless network such as wireless local area networks (WLANs) may include any number of access points (APs) and any number of stations (STAs). An access point may act as a coordinator for communication with the stations. A station may actively communicate with an access point, may be idle, or may be powered down at any given moment depending on the data requirements of the station. Particularly with regard to mobile devices and other devices that are battery powered, minimizing energy consumption is an important aspect in the design of such systems. In particular, the overall power consumption of a typical wireless device includes the energy used by the host processor as well as the various component modules, such as a WLAN module, and the interface used to connect them.

Conventional power saving mechanisms tend to focus on individual elements of the device. For example, the IEEE 802.11 standards controlling WLAN communication provide opportunities for saving power in the WLAN module by placing the transceiver in a low power, or sleep, mode during extended periods of inactivity. However, the device itself often employs a relatively high-powered processor and memory subsystem that consumes a significant portion of the power available to the device. As wireless devices gain capabilities, as exemplified by smart phones, tablets and the like, the relative power consumed by the host processor likewise increases. Further, more power is consumed when higher throughput wireless communication systems are employed, for example, systems employing higher data rates such as those specified by 802.11ac protocols and or systems having multiple data streams in multiple in multiple output (MIMO) architectures.

As such, one area that offers a significant potential for optimizing power efficiency relates to a coordination of power savings modes between the various interconnected functional blocks in a wireless device and the interfaces used to connect them. In most instances, operating one or more aspects of a wireless device in a reduced power mode comes at the expense of reduction in functionality. Accordingly, when desirable to return to normal operation, a period of time is required to reactivate the functional blocks or interfaces in the reduced power mode. This latency is typically proportional to the reduction in power consumed. For example, clock gating has a wake up time on the order of tens of nanoseconds and may be employed to obtain a modest reduction in power as compared to deactivating phase locked loop (PLL) circuits, which represents a greater power savings but requires a wake up time on the order to tens of microseconds. Depending upon the operational state of the wireless device, the functional blocks and interfaces may be permitted to exhibit differing degrees of latency in returning to active mode while maintaining a baseline level of performance.

To that end, techniques have been developed to communicate changing latency tolerances regarding aspects of a wireless device in order to coordinate power saving states. In general, it is desirable to configure and operate the wireless device at the most power efficient settings allowable while still properly executing the necessary functions. By employing a latency tolerance reporting (LTR) function to communicate the current latency requirements of the various aspects of the wireless device required by their operational state, the device may be configured to implement more refined power policy decisions.

One mechanism for implementing LTR involves communication over a bus used to interconnect various aspects of the wireless device. For example, a host processor and memory may be connected to a root complex and communicate through the root complex with one or more endpoints. Current protocols for Peripheral Component Interconnect Express (PCIe) and Universal Serial Bus (USB) interfaces specify methods for communicating LTR information over the interfaces. Thus, the endpoints may communicate changing latency requirements by sending LTR messages over the bus to the root complex. In turn, a power management module, operatively connected to or implemented as part of the root complex, may process the LTR messages and cause the host processor to change power state accordingly. Similarly, the bus interface and the overall state of the wireless device may operate at different power states depending upon the LTR messages.

Conventional LTR techniques in wireless devices have been applied to change latency requirements based upon quasi-static and reactive conditions. For example, relatively defined periods such as network sleep modes coordinated between a station and an access point and entry and exit from chatter mode may be associated with different latency requirements. Examples of reactive triggers for latency changes include buffer over and under runs, in that a resulting error may be used as the trigger for changing latency state. However, despite the power savings that may be achieved by employing LTR techniques in these circumstances, it would be desirable to further reduce power usage in wireless devices.

Accordingly, there has been a need to employ power savings mechanisms that are tailored to characteristics of the activity of the wireless device. In particular, it would be desirable to exploit the patterns of activity associated with WLAN communication resulting from the carrier sense multiple access (CSMA) allocation of access to the wireless medium. Thus, it would be desirable to adjust the latency requirement of a WLAN module in view of the receiving and transmitting parameters being employed. To maximize power efficiency, it would be desirable to adjust the latency requirements with a high degree of granularity, such as on a per frame basis. Further, it would be desirable to optimize power usage of an entire wireless device by adjusting latency tolerance. This specification discloses systems and methods for accomplishing these and other goals.

SUMMARY OF THE INVENTION

This specification discloses systems including a wireless communication device having a root complex, a wireless local area network (WLAN) module, a power module and an interface linking the root complex and the WLAN module, wherein the root complex is configured to implement a power management policy based upon a latency tolerance value for the WLAN module and wherein the power module is configured to adjust the latency tolerance value based upon information received from the WLAN module. The power module may be configured to adjust the latency tolerance value on a per-frame basis. Further, the power module may be configured to adjust the latency tolerance value based upon information obtained from a header of an incoming frame.

In one aspect, the power module may be configured to determine the latency tolerance value based upon a calculation of a number of bits in the incoming frame. The device may also include a receive buffer in the WLAN module, such that the power module may adjust the latency tolerance value based upon a comparison between available space in the receive buffer and the number of bits in the incoming frame.

The power module may be configured to identify a NAP opportunity within an incoming frame, wherein the NAP opportunity may be identified based on a determining that an address mismatch exists with the incoming frame or detecting an error associated with the incoming frame.

In another embodiment, the power module may be configured to adjust the latency tolerance value based upon a known delay for a scheduled transmit time of an outgoing frame.

In yet another embodiment, the power module may be configured to adjust the latency tolerance value to a desired value, such that the WLAN module transmits empty media access control protocol data units (MPDUs) during a delay period associated with the latency tolerance value.

Further, the power module may adjust the latency tolerance value to a next lower value that triggers a change in the power management policy or may adjust the latency tolerance value based upon a resolution of a message communicating the latency tolerance value.

This disclosure is also directed to methods for implementing a power management policy in a wireless communications device, including the steps of obtaining information from a wireless local area network (WLAN) module coupled to a root complex by an interface, determining a latency tolerance value based upon the information from the WLAN module, and applying the latency tolerance value to the interface. The latency tolerance value may be determined on a per-frame basis.

In one aspect, determining the latency tolerance value may be based upon information obtained from a header of an incoming frame. Accordingly, the latency tolerance value based upon calculating a number of bits in the incoming frame. Determining the latency tolerance value also may be based upon a comparison between available space in a receive buffer in the WLAN module and the number of bits in the incoming frame.

In another aspect, determining the latency tolerance value may include identifying a NAP opportunity within the incoming frame based by determining that an address mismatch exists with the incoming frame or by detecting an error associated with the incoming frame.

A further aspect of the disclosure includes adjusting the latency tolerance value based upon a known delay for a scheduled transmit time of an outgoing frame.

In one embodiment, the method may also include the steps of setting the latency tolerance value to a desired value and transmitting empty media access control protocol data units (MPDUs) during a delay period associated with the latency tolerance value.

As desired, the latency tolerance value may be adjusted by reducing the value to a next lower value that triggers a change in the power management policy or based upon a resolution of a message communicating the latency tolerance value.

This disclosure also includes a non-transitory processor-readable storage medium for implementing a power management policy in a wireless communications device having a wireless local area network (WLAN) module coupled to a root complex by an interface, such that the storage medium includes instructions in the form of code that may be configured to obtain information from the WLAN module, code that may be configured to determine a latency tolerance value based upon the information from the WLAN module, and code that may be configured to apply the latency tolerance value to the interface. The code may also be configured to determine the latency tolerance value on a per-frame basis.

In one aspect, the code may be configured to determine the latency tolerance value based upon information obtained from a header of an incoming frame. Further, the code may be configured to determine the latency tolerance value based upon a calculation of a number of bits in the incoming frame. In addition, the code may be further configured to determine the latency tolerance value based upon a comparison between available space in a receive buffer in the WLAN module and the number of bits in the incoming frame.

In another aspect, the code may be configured to determine the latency tolerance value by identifying a NAP opportunity within the incoming frame based on a determination that an address mismatch exists with the incoming frame or by identifying a NAP opportunity within the incoming frame based on detection of an error associated with the incoming frame.

The storage medium may be configured to adjust the latency tolerance value based upon a known delay for a scheduled transmit time of an outgoing frame.

One embodiment of the disclosure includes a storage medium that may also be configured to set the latency tolerance value to a desired value and to cause transmission of empty media access control protocol data units (MPDUs) during a delay period associated with the latency tolerance value.

In another aspect, the storage medium may be configured to adjust the latency tolerance value by reducing the value to a next lower value that triggers a change in the power management policy or to adjust the latency tolerance value based upon a resolution of a message communicating the latency tolerance value.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 4 is table of values that may be used to determine the number of bits in an incoming frame, according to one embodiment of the invention;

FIG. 12 depicts the format of a USB latency tolerance message, suitable for use with one embodiment of the invention;

FIG. 13 is a table showing various CPU operating states (CX), and the associated latencies and power consumption, suitable for use with one embodiment of the invention;

DETAILED DESCRIPTION OF THE INVENTION

Figure 1:
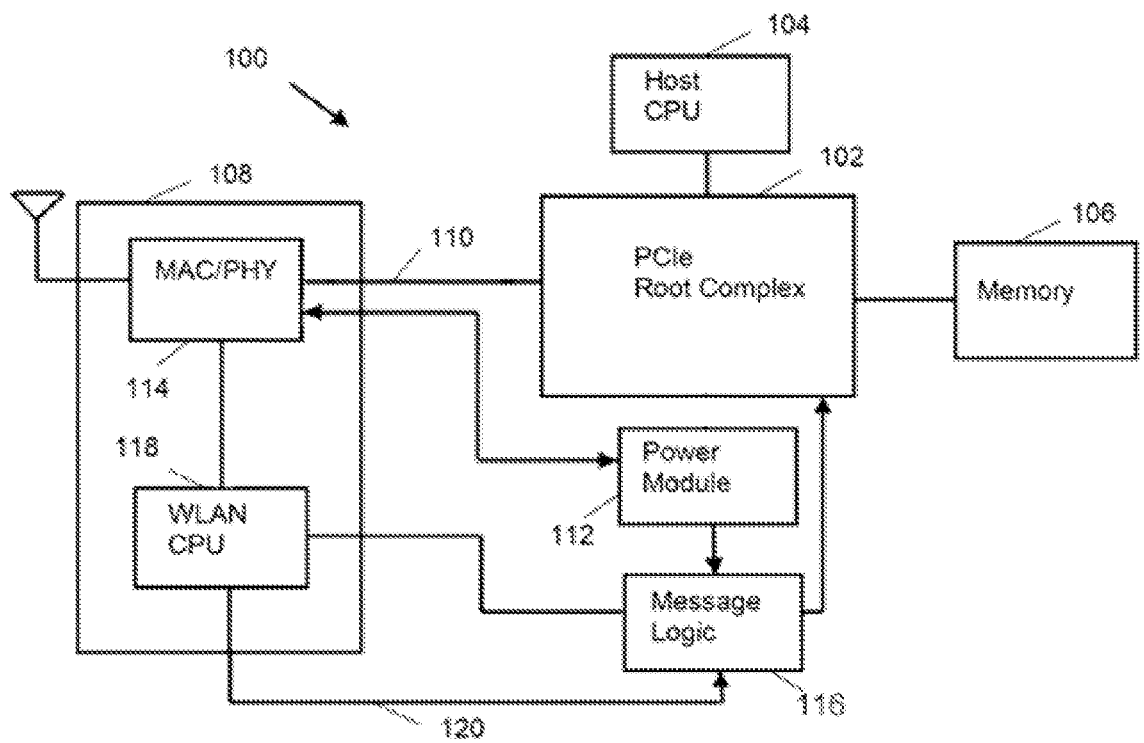
FIG. 1 depicts a schematic representation of functional blocks of a wireless device, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Further, embodiments are discussed in specific reference to wireless networks. As such, this disclosure is applicable to any suitable wireless communication device having the necessary characteristics. Although discussed in specific reference to a station operating in an infrastructure WLAN, the techniques of this disclosure may be applied to other wireless nodes in other network configurations, including ad hoc and peer-to-peer networks.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

This disclosure discloses aggressive LTR adjustments with regard to a WLAN module based on parameters of the receive and transmit paths, as determined on a per-frame basis by reacting real-time on the receiving and transmitting parameters. Significant power savings can be achieved in loaded or congested networks and in less than ideal channel conditions by employing data transfers at rates less than the maximum possible for the device. The techniques of this disclosure enable the platform power of the device to be taken to lower power states even during high performance data throughput conditions of the WLAN module, with little or no perceivable impact on performance. As will be described, this may be achieved by identifying opportunities to adjust the latency tolerant states of the bus interface using information available from the firmware and hardware layers of the WLAN protocol stack. Since the device may be configured such that power save states of the root complex, host processor and other endpoints of the device are controlled by the latency tolerance mechanism of the interface, adjustments to the latency tolerance may be used to optimize power usage across the device.

In one aspect, FIG. 1 schematically depicts functional blocks of a wireless communication device 100 in which PCIe root complex 102 forms the basis of an input and output hierarchy coupling various elements of the device directly or indirectly. Root complex 102 provides connection to host CPU 104, memory 106 and endpoints such as WLAN module 108 over PCIe link 110. Device 100 also includes power module 112 operating as a centralized block for coordinating power save modes of the various functional blocks of device 100, including WLAN module 108, host CPU 104 and root complex 102. As will be described below, power module 112 controls multiple aspects of the power save modes of components of device 100 and may be configured to conform to LTR requirements of the interface.

With regard to WLAN module 108, power module 112 receives information regarding current transmit and receive parameters from the media access control (MAC) and physical (PHY) layers 114 to adjust the latency tolerance of WLAN module 108. For example, power module 112 receives information regarding the MAC transmit and receive paths, receive buffer conditions and back off counters employed by WLAN module 108. Power module 112 may also implement policies on the basis of latency information and control the MAC and PHY layers 114 to enter and exit power save modes. Power module 112 may also be configured to control root complex 102 to override an increased latency tolerance specified by WLAN module 108 when appropriate.

As shown, power module 112 also interacts with LTR message logic block 116 to implement sending of LTR messages according to PCIe protocols. For example, message logic block 116 may include message, configuration and request registers that are accessed by root complex 102 and WLAN CPU 118. In one aspect, power module 112 may communicate with PCIe root complex 102 through WLAN module 108 and message logic 116. In another aspect, root complex 102 may provide the configuration register with information regarding enablement of the LTR mechanism as well as the maximum latency that may be specified for endpoints, such as WLAN module 108. WLAN CPU 118 may provide the message register with an LTR value to be applied to WLAN module 108 based upon transmit or receive conditions and may signal the LTR change using the request register. Message logic block 116 may also be configured to send an interrupt 120 to inform WLAN CPU 118 of a change in the enable state of the LTR mechanism.

In one aspect, power module 112 and message logic block 116 may coordinate to assign varying LTR values to PCIE Root Complex 102. A value representing the smallest relative latency, designated LTR-S for example, may be chosen to correspond to a minimum latency permitted by the design parameters of device 100. Progressively greater values, which may be designated LTR-L, LTR-L+, LTR-L++ for example, may be established that correspondingly are associated with longer latencies to tailor the latency tolerance to different operating conditions. By providing a range of LTR values, the longest LTR value that does not impact performance of the WLAN module 108 beyond a desired level may be selected. Accordingly, based upon information regarding operational characteristics as described below, power module 112 may determine that the latency tolerance for WLAN module 108 may be adjusted from its present value and signal message logic block 116 to send an LTR message, to apply an appropriate value to PCIe root complex 102.

Figure 2:
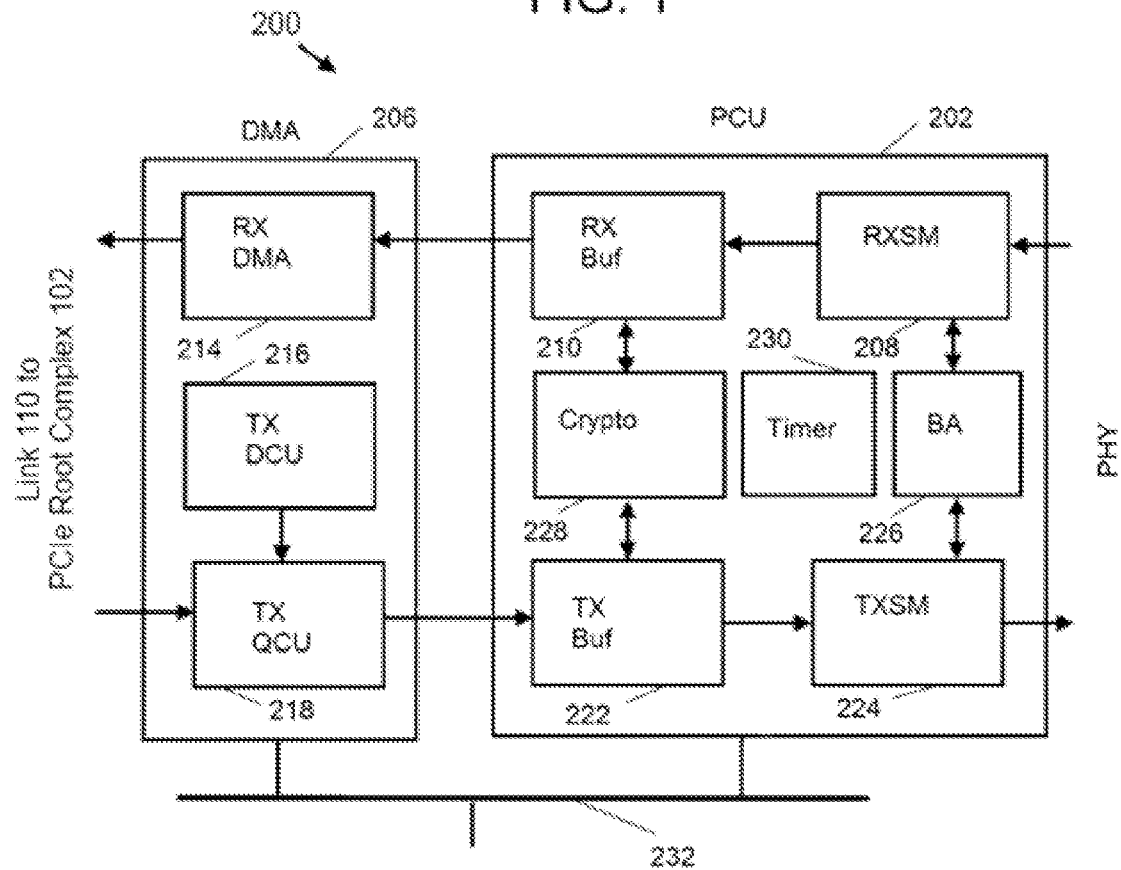
FIG. 2 is a more detailed schematic of the media access control layer of the wireless communication device shown in FIG. 1.

A more detailed schematic of the functional components of the MAC architecture 200 of MAC/PHY layers 114 is shown in FIG. 2. As can be seen, MAC architecture 200 includes protocol control unit (PCU) block 202 coupled to the PHY layer and direct memory access (DMA) block 206 which is coupled to the root complex over the interface. Generally, a receive chain as implemented in MAC architecture 200 may include receive state machine (RXSM) 208 coupled to receive buffer (RX Buf) 210 that outputs to receive DMA (RX DMA) 214 which then outputs to the interface. Likewise, a transmit chain may include transmit distributed coordination function control unit (TX DCU) 216 feeding transmit queue control (TX QCU) 218 which then outputs to transmit buffer (TX Buf) 222. TX Buf 222 in turn feeds transmit state machine (TXSM) 224 which communicates to the PHY layer. PCU block 202 may also include block acknowledgment unit (BA) 226 that interfaces with both RXSM 208 and TXSM 224. Encryption unit (CRYPTO) 228 may be coupled to RX Buf 210 and TX Buf 222 to provide WEP, WPA, WPA2 or other suitable encryption mechanism. Timer 230 coordinates operations of PCU block 202. PCU block 202 and DMA block 206 may also be coupled to a suitable bus 232 as desired. In one embodiment, MAC architecture 200 communicates with a PCIe interface. In another embodiment, MAC architecture 200 may be implemented in an ARM-based system and be overlaid upon an advanced microcontroller bus architecture (AMBA) fabric, such as an Advanced Peripheral Bus (APB) or an Advanced eXtensible Interface (AXI) as desired.

Figure 3:
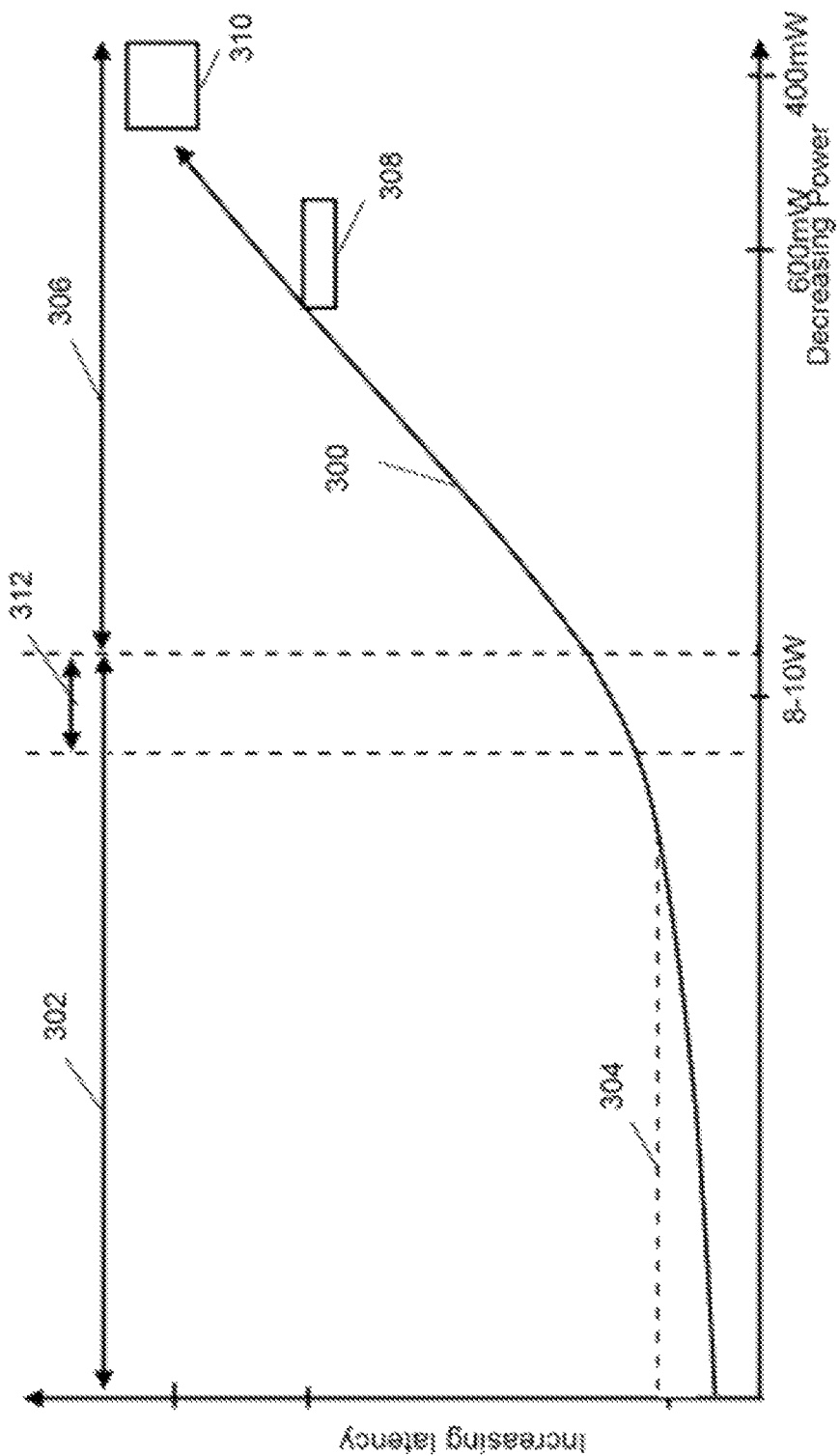
FIG. 3 is a graph representing the relationship between increasing latency and decreasing power usage.

Aspects of the disclosure with regard to adjusting latency requirements to achieve improved power efficiency may be appreciated in view of the relationship between increased latency and reduced power consumption. FIG. 3 represents power consumed by a device having varying latency tolerances. At the left of the graph, curve 300 represents a device carrying a full workload and consuming maximum power. As shown, the response latency of the device is minimized at this point and corresponds to optimized performance The device may be considered to be in an active state in zone 302. Within the active zone 302, a minimum latency expectation 304 may govern operation of the device. Although still active, as the workload diminishes, the power consumed may be reduced and some power savings may be realized, such as by operating the processor of the device in different states. This relationship is depicted as curve 300 moves along zone 302. Following the active zone 302 is inactive zone 306 which may represent various power save modes of the device, including state 308 and state 310. As shown, as the device's response latency increases, the power consumed decreases. The techniques of this invention may be particularly applicable to operation in zone 312, wherein the device is still active, but due to diminished workload requirements, is relatively idle. Accordingly, the power consumed during zone 312 is greater than necessary given the workload. By employing the LTR adjustments described herein, the amount of power, particularly in zone 312, may be reduced.

Accordingly, one aspect of this disclosure relates to adjustments made to the LTR for WLAN module 108 during active reception. Power module 112 may be configured to obtain information regarding receive parameters from the PHY layer of MAC/PHY layers 114, such as on a per frame basis. Suitable parameters may include the total number of incoming data bits and the ability for the incoming frame to be implicitly buffered in RX Buf 210 for a sufficient period of time. As will be described in more detail below, the duration of buffering may be associated with the size of RX Buf 210. By exploiting the ability of RX Buf 210 to receive incoming bits while operating at lower power levels associated with increased latency tolerances, power savings may be realized even while actively operating at high throughput rates.

As received frames, also known as physical layer convergence protocol data units (PPDUs), are processed in the MAC/PHY layers 114 of WLAN module 108, the total number of incoming data bits may be determined based upon the number of data streams involved, the number of symbols, the modulation and coding scheme (MCS) and the active bandwidth of the receive chain. In legacy frames, such as 802.11 a/g, the number of data streams is 1 and in high throughput (HT) or very high throughput (VHT) frames may be determined from the SIG-A field of the PPDU header. The number of symbols may be calculated from the length of the frame as determined from the L-SIG field divided by a factor based upon the length of the guard interval employed by the modulation scheme. For example, the length from the L-SIG field divided by 3 represents the number of symbols when a guard interval of 800 ns is used. The MCS number may be obtained from the L-SIG in legacy frames and from the SIG-A in (V)HT frames. The active bandwidth may be expressed as a multiple of 20 MHz and is 20 MHz in legacy frames and may be 20, 40, 80 or 160 MHz in V(HT) frames and is reported in the SIG-A field. Therefore, the total number of bits may be calculated in real time from the information in the PPDU header as the product of the number of data streams, the number of data bits per symbol, the bandwidth multiple and the number of data streams.

Alternatively, a look up table (LUT) may be used having predetermined values. An example of suitable table is given in FIG. 4, which depicts a table having values for a PPDU conforming to 802.11ac (VHT) standards.

After determining the total number of incoming bits for a given PPDU, power module 112 may compare the value to the size of the MAC RX Buf 210. When the determined number of incoming data bits is less than the size of the buffer, the buffer can be filled with the incoming data without causing an overflow condition or resulting in data loss. Correspondingly, the buffering capacity, as expressed in time units, may be used to adjust the LTR value associated with WLAN module 108. In one example, RX Buf 210 may be 8 KB. At a rate of 1500 bytes per 8 µs, this corresponds to a buffering duration of approximately 40 µs. This duration thus obtained may guide the selection of an appropriate LTR interval. Further, the size of RX Buf 210 may be increased to permit more aggressive LTR adjustments.

Thus, power module 112 may determine the number of incoming bits based upon the information obtained from MAC/PHY layers 114 by decoding the L-SIG or SIG-A fields, depending upon the protocol of the PPDU frame. By comparing the time required to receive the incoming bits to the time associated with the buffering capacity, power module 112 may determine an appropriate LTR value and signal message logic block 116 to send an LTR message to root complex 102 to change the LTR value such as from LTR-S to LTR-L.

Figure 5:
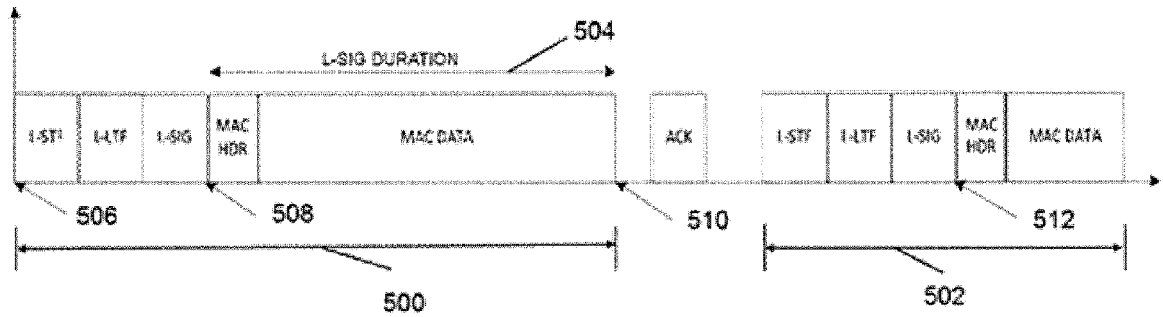
FIG. 5 is a representation showing adjustments made to a latency tolerance value during reception of an incoming legacy frame, according to one embodiment of the invention.

FIG. 5 shows an example of a sequence of legacy PPDU frames 500 and 502 with the associated timing of LTR transitions effected by the sending of LTR messages specifying different LTR values. The start of frame 500 may be used as a trigger to establish or reestablish an LTR-S value corresponding to the minimum latency desired for WLAN module 108 at time 506. As described above, after the L-SIG field is parsed, a determination may be made regarding the length of L-SIG duration 504 of frame 500 from the length value. If the total number of incoming bits associated with frame 500 will fit within RX Buf 210, power module 112 may trigger message logic block 116 to send an LTR message having an LTR-L value at time 508, to increase the latency tolerance of WLAN module. In one aspect, the determination to trigger a change to LTR-L may be determined based upon the total number of incoming bits being less than a pre-configured margin to guard against overruns. In one embodiment, it may be desirable to reestablish the LTR-S value following reception of frame 500 at time 510 to prepare for reception of frame 502. Alternatively, LTR-L may be retained until the L-SIG from frame 502 is decoded at time 512. The LTR value may then be adjusted by sending an LTR-L+ or an LTR-S as warranted by the information in the PPDU header. Further, the periodicity of LTR messaging may be controlled to follow the constraints recommended by the interface. For example, the PCIe protocol advises against sending more than 2 LTR messages per 500 μs.

Figure 6:
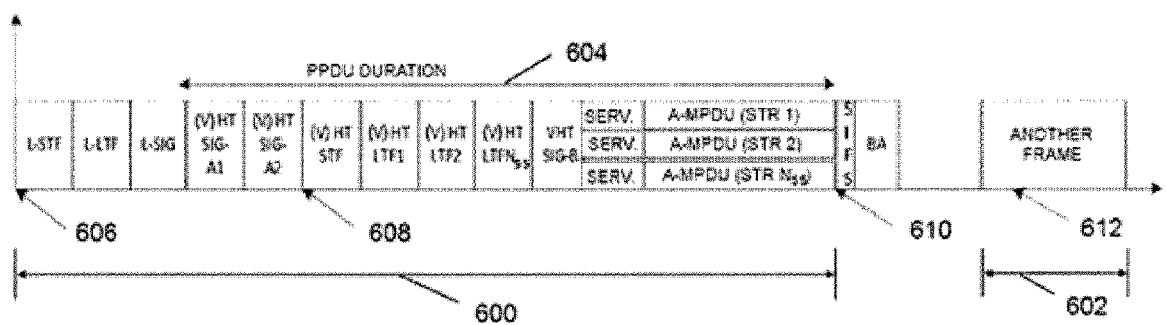
FIG. 6 is a representation showing adjustments made to a latency tolerance value during reception of an incoming (V)HT frame, according to one embodiment of the invention.

Similarly, FIG. 6 shows an example of a sequence of (V)HT PPDU frames 600 and 602 with the associated timing of LTR transitions caused by the sending of LTR messages specifying different LTR values. The start of frame 600 may be used as a trigger to establish or reestablish an LTR-S value corresponding to the minimum latency desired for WLAN module 108 at time 606. As described above, after the L-SIG field is parsed, a determination may be made regarding the length of PPDU duration 604 of frame 600 by dividing the L-SIG length value by a factor depending upon the length of the guard interval to calculate the number of symbols. Based upon the calculations described above, a determination may be made whether the total number of incoming bits associated with frame 600 will fit within RX Buf 210. Upon making a determination that the available buffer space is sufficient to receive the incoming bits, including a pre-configured margin if desired, power module 112 may trigger the sending of an LTR message having an LTR-L value at time 608, to increase the latency tolerance of WLAN module 108. In one embodiment, it may be desirable to reestablish the LTR-S value following reception of frame 600 at time 610 to prepare for reception of frame 602. Alternatively, LTR-L may be retained until the L-SIG from frame 602 is decoded at time 612, and the LTR value set to LTR-S, LTR-L+, or another suitable LTR value as warranted.

In other aspects of this disclosure, an adjustment to the LTR value of PCIe root complex 102 associated with WLAN module 108 may be made during periods of idle reception. For example, device 100 may be configured to function in the role of a station in an infrastructure network architecture, and may operate in an idle mode when an associated access point is transmitting frames to a different station. Due to the contention mechanisms associated with CSMA, there may be a substantial number of reception null intervals due to the access point transmitting to other stations. Thus, particularly in heavily used networks, the LTR techniques may represent the potential for significant power savings. To the extent the duration of the receive null periods can be pre-determined, power module 112 may be configured to modulate the LTR state by changing from LTR-S values to LTR-L, LTR-L+ (longer) or LTR-L++ (longest) values. As desired, fewer or greater numbers of LTR values may be implemented.

Accordingly, during idle receive periods, power module 112 may obtain information related to these receive null periods from the PPDU headers as they are parsed by MAC/PHY layers 114. These null periods are termed herein "NAP" opportunities and may be determined based upon a number of factors. In one aspect, NAP opportunities may be identified based upon determination of a mismatch between an address of the frame and the address of the WLAN module 108, indicating that the incoming frame is not addressed to device 100. In VHT frames, the partial association identification (pAID) may indicate a mismatch for device 100 operating in single user reception mode and the group identification (GID) may indicate a mismatch when operating in multiuser reception mode. In legacy and HT frames, the receiver address (RA) from the MAC header may indicate a mismatch for device 100 operating in single user reception mode. In such embodiments, the network allocation vector (NAV) which corresponds to the amount of time the medium is being reserved for transmittal of the current frame may be used to establish the appropriate LTR value.

Another example of information from the PPDU frame that may be used to identify a NAP opportunity includes corruption in the 1st through nth delimiter of an aggregate MAC protocol data unit (A-MPDU). Further, PHY errors incurred during reception of the frame, such as automatic gain control (AGC) settling errors, below minimum received signal strength indication (RSSI) values, and the like, result in a deferral of the extended interframe space (EIFS) but not a retransmission. Such errors may be identified as NAP opportunities.

The duration of each NAP opportunity identified using the triggers discussed above may be determined as discussed from the duration values in the L-SIG and SIG-A fields. For example, the L-SIG duration divided by 3 gives the number of symbols in the frame when a guard interval of 800 ns is employed. The number of symbols may then be multiplied by the symbol duration (4 μs, e.g.) to determine an appropriate LTR value. Correspondingly, each NAP opportunity may be identified by power module 112 as a trigger to enter a higher latency tolerant state.

Figure 7:
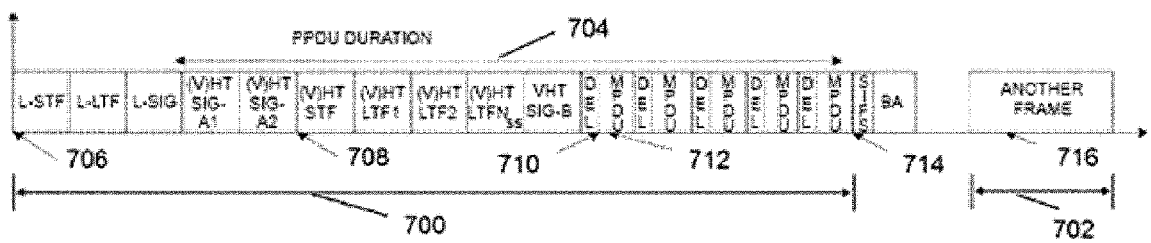
FIG. 7 is a representation showing adjustments made to a latency tolerance value during reception of an incoming frame involving a NAP opportunity, according to one embodiment of the invention.

FIG. 7 shows one example of a sequence of PPDU frames 700 and 702 with the associated timing of LTR transitions effected by the sending of LTR messages specifying different LTR values. The start of frame 700 may be used as a trigger to establish or reestablish an LTR-S value corresponding to the minimum latency desired for WLAN module 108 at time 706. As described above, various triggers may be employed to send an LTR value corresponding to an increased latency, such as an LTR-L value. At time 708, parsing the SIG-A field in a (V)HT frame may identify a pAID or GID mismatch, allowing an LTR message to be sent. Alternatively, the trigger event may be a corrupt delimiter (the first delimiter as shown in FIG. 7), allowing the latency of WLAN module 108 to be set to the LTR-L value at time 710. In yet another example, parsing an MPDU field may identify a RA mismatch in the MPDU header, allowing the LTR-L message to be triggered at time 712. As desired, the LTR-S value may be reestablished following reception of frame 700 at time 714 to prepare for reception of frame 702. Alternatively, the adjusted LTR value may be retained until frame 702 is decoded at time 712, and the LTR value may then be set to LTR-S, LTR-L+, or another LTR value as appropriate.

Such NAP opportunities provide a significant amount of power saving potential even during an otherwise high-performance WLAN access mode. For example, in typical use cases an approximately 1 ms NAP duration may be used to configure the LTR value for WLAN module 108. When a transmission opportunity is identified that reserves the wireless media, an approximately 4 ms NAP duration may be determined and even in minimum cases, an approximately 500 μs duration may be identified, and will be dependent on legacy MPDU singles or VHT aggregation modes.

Figure 8:
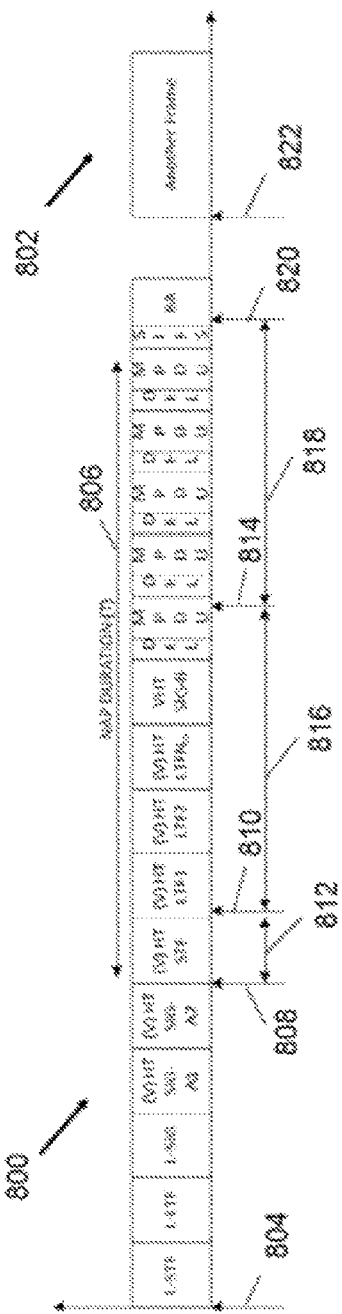
FIG. 8 is another representation showing adjustments made to a latency tolerance value during reception of an incoming frame involving a NAP opportunity, according to one embodiment of the invention.

FIG. 8 shows another aspect of the disclosure in which the implementation of LTR adjustment is configured to preserve performance As shown with regard to frames 800 and 802, LTR-S is set at time 804 with a value of 5 μs. After parsing the L-SIG and SIG-A fields, a NAP duration T 806 is determined using one of the triggers as described above. However, at time 808, an LTR message is sent with an LTR-L value set to one-half the duration T, LTR-L 816. Due to the LTR-S latency, the LTR-L takes effect approximately 5 μs after the message is sent, at time 810. During the period 812 between time 808 and time 810, LTR-S remains in effect. After the LTR-L period has elapsed at time 814, the LTR value is readjusted to LTR-S, which takes effect after the remaining half NAP duration 818, at time 820. As in the above embodiments, an LTR-S message may be sent at the beginning of frame 802 at time 822. The LTR state change is subject to the same latency as the memory accesses, therefore setting LTR-L to one-half the NAP duration T minimizes the chances of overrun with the arrival of frame 802.

Figure 9:
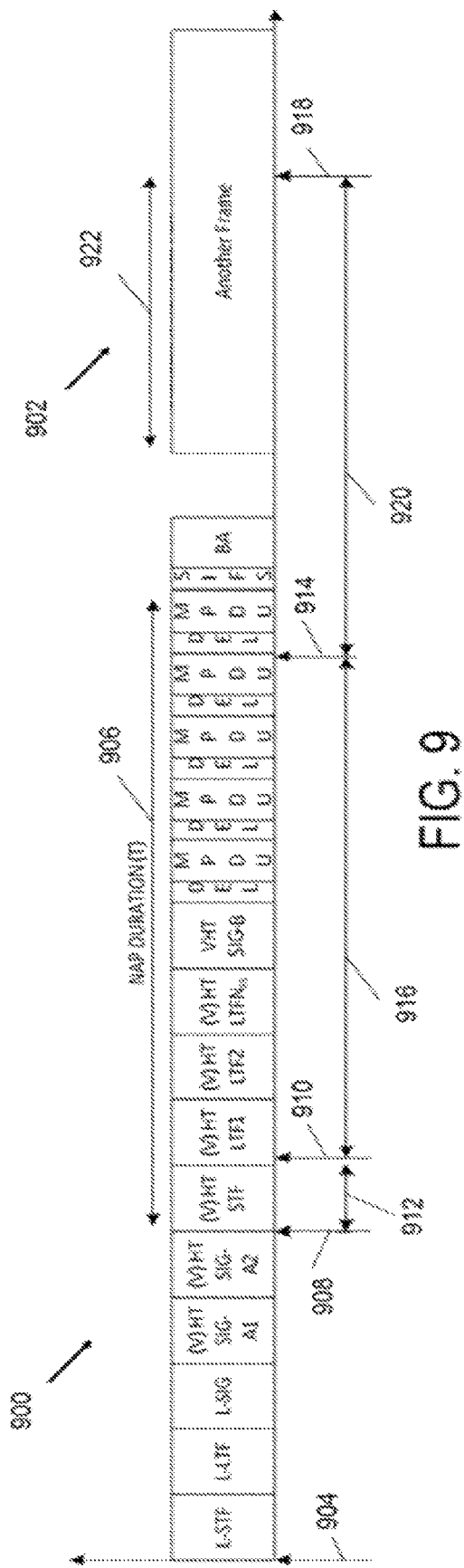
FIG. 9 is yet another representation showing adjustments made to a latency tolerance value during reception of an incoming frame involving a NAP opportunity, according to one embodiment of the invention.

Another approach is shown in FIG. 9, which involves the use of an LTR-L greater than one-half the NAP duration but less than the full duration. As shown with regard to frames 900 and 902, LTR-S is set at time 904. After parsing the L-SIG and SIG-A fields, a NAP duration T 906 may be determined using one of the triggers as described above. At time 908, an LTR message is sent with an LTR value set to an amount between one-half the duration T and the duration T, such as LTR-L 916. Due to latency, the LTR-L takes effect approximately 5 μs after the message is sent, at time 910. During the period 912 between time 908 and time 910, LTR-S remains in effect. After the LTR-L period has elapsed at time 914, the LTR value may be readjusted to LTR-S. However, the change in LTR is not effected until time 918, after period 920 which corresponds to the amount of time necessary to restore the LTR value from LTR-L to LTR-S, which is the same as LTR-L 916. As a result, the latency is not adjusted for a period 922 during which frame 902 is received. Accordingly, LTR-L may be configured depending upon the size of RX Buf 210 so that no data is lost during this interval, such that the LTR value used at the trigger may be a fractional value (>x% and ≤1) of the actual NAP duration as determined by a sufficiently sized RX Buf 210. RX Buf 210 may then store the next arriving frame 902 for the amount of time necessary to change the LTR state.

Figure 10:
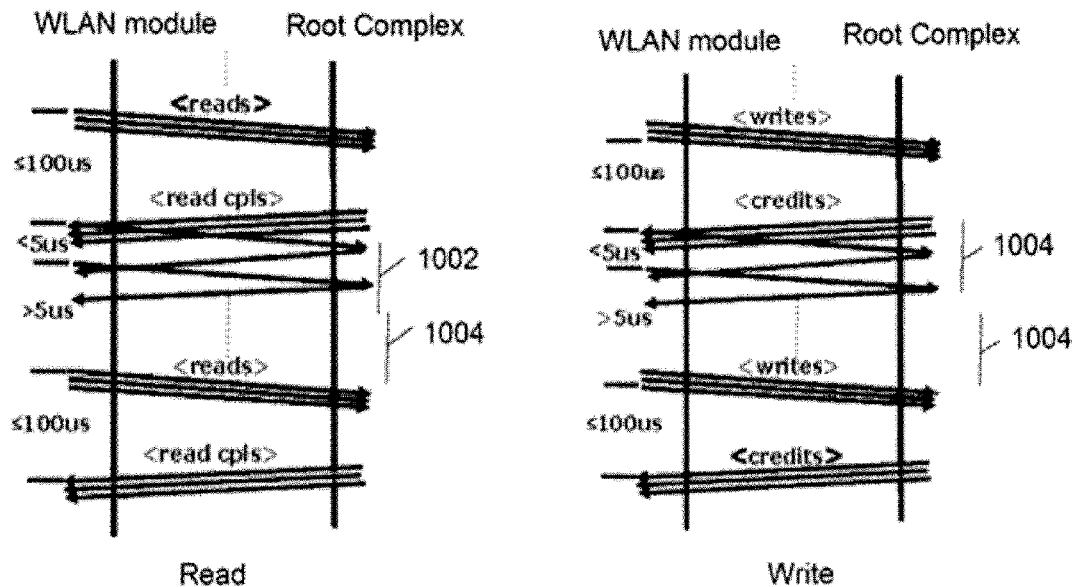
FIG. 10 is a representation of the lead-off cycle of PCIe interface, suitable for use with one embodiment of the invention.

In one aspect, the operation of the interface may avoid the need to incur additional latencies, even when the LTR values for WLAN module 108 or another endpoint are adjusted following the above techniques. For example, the PCIe interface features a lead-off cycle whereby the LTR latency is imposed only upon the first transaction and subsequent read and write access operations occurring within a 5 μs window are not subject to the LTR latency. The PCIe lead-off cycle is depicted in FIG. 10 and shows read transactions and write transactions between WLAN module 108 and root complex 102. The LTR lead-off cycle is the duration that root complex 102 enters a power save state based upon the LTR value, which is 100 μs as depicted here, and access operations during that period are deferred until completion of the cycle. However, subsequent transfers utilizing the interface within a 5 μs period may not be subject to the LTR latency. For example, read operations <reads> in group 1002 are separated by less than 5 μs and receive <read cpls> without delay, while <reads> in group 1004 are separated by more than 5 μs resulting in imposition of the LTR latency before receiving the <read cpls>. Similarly, write operations <writes> in group 1006 are separated by less than 5 μs and receive <credits> without delay, while <writes> in group 1008 are separated by more than 5 μs resulting in imposition of the LTR latency before receiving the returned <credits>. Accordingly, configuring MAC/PHY layers 114 to transmit information over PCIe link 110 within intervals of 5 μs may result in grouping the transmissions such that an increased latency may only be applied to the transaction initiating the group.

Figure 11:
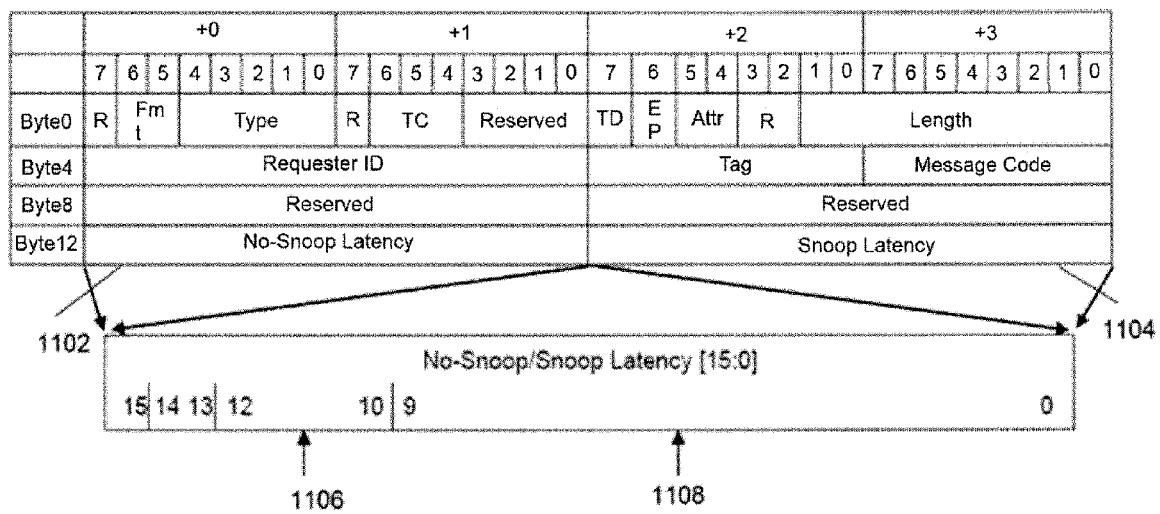
FIG. 11 depicts the format of a PCIe latency tolerance message, suitable for use with one embodiment of the invention.

As described above, a suitable value for LTR may be determined based upon information obtained from MAC/PHY layers 114 regarding parameters of the receive and transmit paths. However, it may also be desirable to match the selected LTR value to the granularity offered by the implementation of the LTR scheme in interface of root complex 102. For example, under the PCIe protocol, LTR values are communicated using the transaction layer protocol (TLP). Accordingly, LTR messages may be sent using a TLP frame with the appropriate fields. FIG. 11 shows the format for an LTR message in conformance with the PCIe protocol. Fields 1102 and 1104 contain the latency value for no-snoop and snoop states, respectively. As shown in the detail view, the structure of fields 1102 and 1104 is the same and includes a 3 bit latency scale 1106 and a 10 bit latency value 1108. The latency is obtained by multiplying the value from 1108 by the scale 1106. The scales are selected from 1 ns, 32 ns, 1024 ns, 32,768 ns, 1,048,576 ns and 33,554,432 ns. As a result, absolute LTR times are subject to the granularity established by the scale chosen in field 1104. Therefore, a suitable LTR value may be chosen based upon the resolution capable of being communicated using the PCIe protocol. In general, therefore, the LTR value may be chosen as the next lowest value to the value determined based on the calculations of the receive and transmit parameters that may be expressed in the LTR message format.

Similarly, embodiments using a root complex 102 having a USB interface are also subject to the granularity of the messaging format. As shown in FIG. 12, a USB 3.0 protocol LTR message format includes the Best Effort Latency Tolerance (BELT) field 1202. BELT field employs a 2 bit scaling factor to provide granularities of 1024 ns, 32,768 ns and 1,048,576 ns and a 10 bit value. Likewise, it may be desirable to select the appropriate LTR value based upon the resolution offered by the BELT field.

In an additional aspect, it may be desirable to select an LTR value sufficient to trigger an operating change driven by the LTR implementation. For example, the operating state of Host CPU 104 may be responsive to the LTR values communicated through root complex 102. For example, FIG. 13 shows a table of various CPU operating states (CX), and the associated latencies and power consumption. In general, it may be desirable to set an LTR value that will trigger a change to the most power efficient operating state available without exceeding the LTR value determined on the basis of the receive and transmit parameters.

Figure 14:
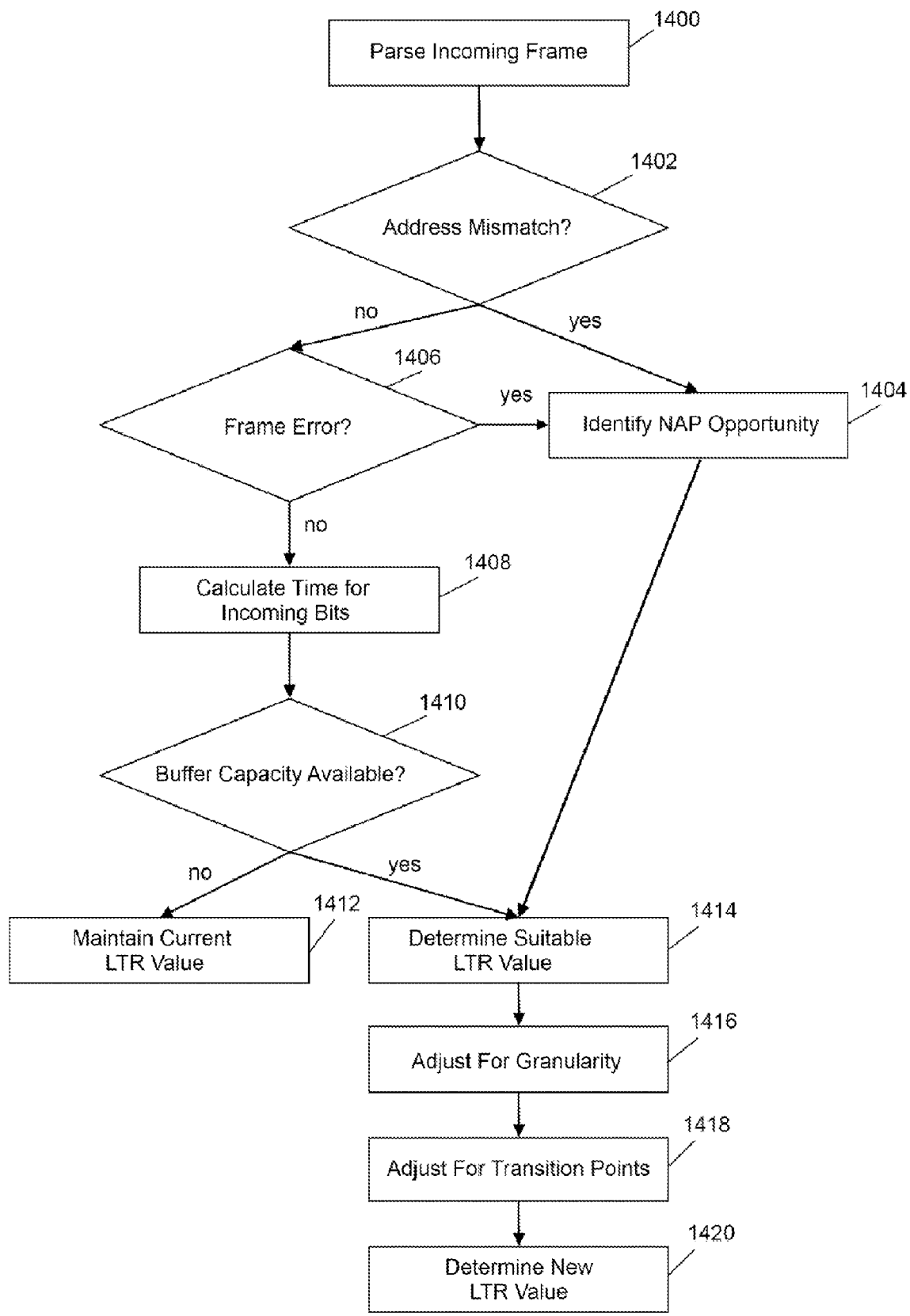
FIG. 14 depicts a flowchart showing a routine for determining a suitable LTR value on the basis of characteristics of an incoming frame, according to one embodiment of the invention.

To help illustrate aspects of the disclosure, FIG. 14 is a flow chart showing one suitable routine that may be employed to determine a suitable LTR value on the basis of characteristics of an incoming frame. Beginning with step 1400, power module 112 may receive information from MAC/PHY layers 114 regarding a frame as it is being received. Power module 112 determines whether the information from MAC/PHY layers 114 indicates an address mismatch in step 1402. If there is, a NAP opportunity is identified using the techniques described above, as indicated by step 1404. Alternatively, the information is used to determine whether a frame error, such as those described above, exists in step 1406. If so, power module 112 may also identify a NAP opportunity, as indicated by the routine progressing to step 1404. Otherwise, the information from MAC/PHY layers 114 may be used calculate a time corresponding the number of incoming bits of the frame being received as indicated by step 1408. Next, power module 112 may determine whether available buffer capacity, such as through RX Buf 210, is sufficient for the incoming bits in step 1410. If the buffer capacity is not sufficient, power module 112 may be configured to maintain the current LTR value as indicated by step 1412.

However, if there is sufficient buffer capacity, or if NAP opportunity has been identified, such as in step 1404, power module 112 may be configured to determine a suitable LTR value, according to the techniques described above, as represented by step 1414. Further, power module 112 may adjust the determined LTR value to accommodate the granularity or resolution of the messaging protocol used to communicate the LTR value in step 1416. Additionally or alternatively, power module 112 may adjust the determined LTR value to a value configured to signal a transition in power state for one or more additional functional components in step 1418. As discussed above, the LTR value may be returned to a previous value, such as LTR-S, at a desired point during reception of the incoming frame or following reception of the frame as indicated by step 1420. For example, the LTR value may be returned to a previous value (or another suitable value) immediately following reception of the current frame as described with respect to FIG. 5, during reception of a portion of a subsequent frame as described with respect to FIG. 6, or during reception of a portion of the current frame as described with respect to FIG. 8.

Further applications of the LTR adjustments described herein may be made with reference to the transmit path. As conventionally implemented, MAC/PHY layers 114 will issue a DMA read request to root complex 102 exactly when the transmission is scheduled to occur. Since MAC/PHY layers 114 expects an immediate response to the DMA request in order to transmit the first MPDU, a transmission under-run error may be triggered if root complex 102 applies an LTR latency to the DMA request. As will be discussed below, the techniques of this disclosure accommodate the requirement for MAC/PHY layers 114 to have real-time data access through root complex 102.

In one aspect, device 100 may be in an awake state such that the header of the first MPDU frame may be downloaded from host memory 106 into MAC/PHY layers 114 subject to the existing LTR state, which may be LTR-S as device 100 is awake. Software in WLAN CPU 118 may be configured to program the appropriate transmit descriptor and trigger MAC/PHY layers 114 for transmission of the MPDU. Due to CSMA, in a loaded network, and depending on past channel usage by device 100, a local back off counter may have a value as high as approximately 100 µs or more before the scheduled transmission may take place. Power module 112 may be configured to have awareness of the back off counter from MAC/PHY layers 114 and may therefore directly map the known back off delay to an appropriate LTR value, as desired. Accordingly, upon change of the LTR state, MAC/PHY layers 114 issues the read request for the first MPDU and receives the data after the lead-off cycle of root complex 102 following the delay. This coordinates with the scheduled transmission. In one aspect, the LTR value may be configured to employ a pre-determined margin to ensure that the DMA request is satisfied prior to the scheduled transmission. In particular, it may be desirable to apply these techniques during transmission of A-MPDUs.

In other aspects, to ensure timely satisfaction of the DMA request, a suitable LTR value may be determined based upon the minimum of all back off counters from all programmed and scheduled transmissions. Further, if device 100 is in a non-active state when the transmission was triggered from the host, the initial state of root complex 102 may be an increased LTR value, such as LTR-L, causing the header to be downloaded under those latency conditions. As PCIe standards call for no more than 2 LTR messages being sent in a 500 µs period, it may be desirable to adjust the LTR value to LTR-S at this point and not dynamically adapt the LTR to the back off counter. Alternatively, power module 112 may poll the back off counter for the affected transmit queue, and set an appropriate LTR value subject to the minimum of the back off values of all transmit queues as discussed.

Figure 15:
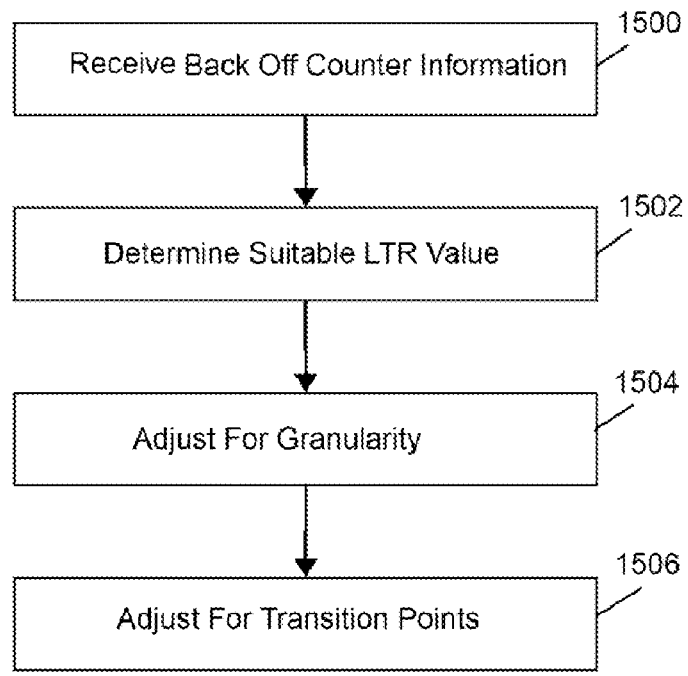
FIG. 15 depicts a flowchart showing a routine for determining a suitable LTR value on the basis of back off counter information, according to one embodiment of the invention.

To help illustrate aspects of the disclosure, FIG. 15 is a flow chart showing a suitable routine for determining a suitable LTR value based upon back off information. As represented by step 1500, power module 112 may receive back off counter information from MAC/PHY layers 114. As described above, the back off counter information may correspond to a given scheduled transmission or to a combination of multiple transmissions. In step 1502, power module 112 may be configured to determine an LTR value, such that the latency associated with the subsequent reception of the results of a DMA request may synchronize with expiration of the back off counter. Further, power module 112 may adjust the determined LTR value to accommodate the granularity or resolution of the messaging protocol used to communicate the LTR value in step 1504. Additionally or alternatively, power module 112 may adjust the determined LTR value to a value configured to signal a transition in power state for one or more additional functional components in step 1506.

Another aspect of LTR adjustment also may be based upon parameters of the transmit path during an A-MPDU transmission. In some embodiments, device 100 may be configured to employ features of an architecture that includes the use of empty MPDUs to prevent buffer under-runs. Thus, if MAC/PHY layers 114 issue a DMA request that is not satisfied, device 100 may be configured to send empty MPDUs, separated by delimiters, until the MPDU data becomes available. This minimizes the impacts of buffer under-runs by preventing error conditions and loss of the medium, at the expense of a decrease in throughput. In devices having this capability, power module 112 may be configured to determine an increased LTR value in order to conserve power. Since the operation of MAC/PHY layers 114 described above prevents buffer under-run errors, the delay imparted by the increased LTR may be accommodated with minimal disruption to the communications link. For example, through the continued operation corresponding to the transmission of empty MPDUs, device 100 may maintain priority with respect to CSMA and the remote device sharing the link may maintain the link as active. Although the transmission of empty MPDUs may represent a short term reduction in throughput, overall throughput may be improved by avoiding overhead associated with reestablishing communications links or contending for medium access.

As such, a balance between power usage and performance may be implemented as desired by establishing an appropriate LTR value. In one aspect, the LTR value on the transmit path may be increased, such as to LTR-L, based upon macro use-cases, such as quality of service (QoS) traffic class and access control requirements. In on example, lower priority traffic class may be assigned a default LTR value on the transmit path. In another example, all traffic may be assigned an increased LTR value, such as LTR-L, to enable a power save mode for device 100.

Figure 16:
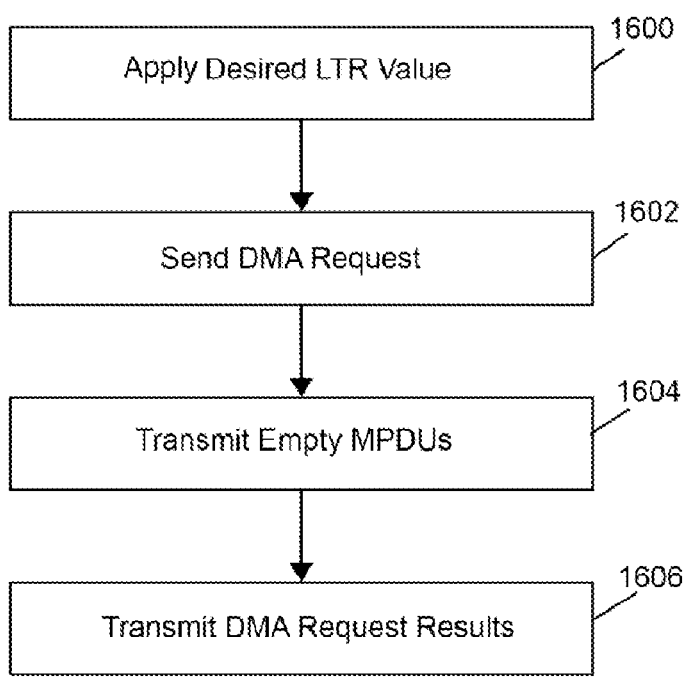
FIG. 16 depicts a flowchart showing a routine for applying a desired LTR value while maintaining a communications link, according to one embodiment of the invention

To help illustrate aspects of the disclosure, FIG. 16 is a flow chart showing a suitable routine for applying a desired LTR value while maintaining a communications link. As represented by step 1600, power module 112 may be configured to apply an LTR value to PCIe root complex 102 for WLAN module 108 configured to achieve a desired balance between power savings and performance. MAC/PHY layers 114 may then issue a DMA request that may experience a latency associated with the applied LTR value as indicated by step 1602. MAC/PHY layers 114 may further be configured to transmit empty MPDUs during a period of time corresponding to the latency associated with the applied LTR value in step 1604. Then, MAC/PHY layers 114 may transmit the results of the DMA request when received in step 1606.

Described herein are presently preferred embodiments. However, one skilled in the art that pertains to the present invention will understand that the principles of this disclosure can be extended easily with appropriate modification. For example, although the above embodiments have been described primarily in the context of a PCIe interface, one of skill in the art will recognize that other suitable interfaces, such as USB or suitable advanced microcontroller bus architecture (AMBA) interfaces may be used, as well as combinations of interfaces including bridges between different interfaces.

What is claimed is:

1. A wireless communications device comprising a root complex, a wireless local area network (WLAN) module, a power module and an interface linking the root complex and the WLAN module, wherein the root complex is configured to implement a power management policy based upon a latency tolerance value for the WLAN module and wherein the power module is configured to adjust the latency tolerance value based upon information received from the WLAN module regarding at least one from the group consisting of a receive path parameter associated with a frame being received by the WLAN module, wherein the latency tolerance value is adjusted in real-time before reception of the frame is complete, and a transmit path parameter associated with a frame to be transmitted, wherein the tolerance value is adjusted in real-time before transmission of the frame is complete.

2. The device of claim 1, wherein the power module is configured to adjust the latency tolerance value based upon information obtained from a header of an incoming frame.

3. The device of claim 2, wherein the power module is configured to determine the latency tolerance value based upon a calculation of a number of bits in the incoming frame.

4. The device of claim 3, further comprising a receive buffer in the WLAN module, wherein the power module adjusts the latency tolerance value based upon a comparison between available space in the receive buffer and the number of bits in the incoming frame.

5. The device of claim 2, wherein the power module is configured to identify a NAP opportunity within an incoming frame, wherein the NAP opportunity is identified based on a determination that an address mismatch exists with the incoming frame.

6. The device of claim 2, wherein the power module is configured to identify a NAP opportunity within the incoming frame, wherein the NAP opportunity is identified based on detection of an error associated with the incoming frame.

7. The device of claim 1, wherein the power module is configured to adjust the latency tolerance value based upon a known delay for a scheduled transmit time of an outgoing frame.

8. The device of claim 1, wherein the power module is configured to adjust the latency tolerance value to a desired value, such that the WLAN module transmits empty media access control protocol data units (MPDUs) during a delay period associated with the latency tolerance value.

9. The device of claim 1, wherein the power module is configured to adjust the latency tolerance value to a next lower value that triggers a change in the power management policy.

10. The device of claim 1, wherein the power module is further configured to adjust the latency tolerance value based upon a resolution of a message communicating the latency tolerance value.

11. A method for implementing a power management policy in a wireless communications device, comprising obtaining information from a wireless local area network (WLAN) module coupled to a root complex by an interface, determining a latency tolerance value based upon the information from the WLAN module regarding at least one from the group consisting of a receive path parameter associated with a frame being received by the WLAN module, wherein the latency tolerance value is adjusted in real-time before reception of the frame is complete, and a transmit path parameter associated with a frame to be transmitted, wherein the latency tolerance value is adjusted in real-time before transmission of the frame is complete, and applying the latency tolerance value to the interface.

12. The method of claim 11, further comprising determining the latency tolerance value based upon information obtained from a header of an incoming frame.

13. The method of claim 12, further comprising determining the latency tolerance value based upon calculating a number of bits in the incoming frame.

14. The method of claim 13, further comprising determining the latency tolerance value based upon a comparison between available space in a receive buffer in the WLAN module and the number of bits in the incoming frame.

15. The method of claim 12, further comprising identifying a NAP opportunity within the incoming frame based on a determination that an address mismatch exists with the incoming frame.

16. The method of claim 12, further comprising identifying a NAP opportunity within the incoming frame based on detecting an error associated with the incoming frame.

17. The method of claim 11, further comprising adjusting the latency tolerance value based upon a known delay for a scheduled transmit time of an outgoing frame.

18. The method of claim 11, further comprising setting the latency tolerance value to a desired value and transmitting empty media access control protocol data units (MPDUs) during a delay period associated with the latency tolerance value.

19. The method of claim 11, further comprising adjusting the latency tolerance value by reducing the value to a next lower value that triggers a change in the power management policy.

20. The method of claim 11, further comprising adjusting the latency tolerance value based upon a resolution of a message communicating the latency tolerance value.

21. A non-transitory processor-readable storage medium for implementing a power management policy in a wireless communications device having a wireless local area network (WLAN) module coupled to a root complex by an interface; the processor-readable storage medium having instructions thereon, the instructions comprising code configured to obtain information from the WLAN module regarding at least one from the group consisting of a receive path parameter associated with a frame being received by the WLAN module, wherein a latency tolerance value is adjusted in real-time before reception of the frame is complete, and a transmit path parameter associated with a frame to be transmitted, wherein a latency tolerance value is adjusted in real-time before transmission of the frame is complete, code configured to determine the latency tolerance value based upon the information from the WLAN module, and code configured to apply the latency tolerance value to the interface.

22. The storage medium of claim 21, wherein the code is configured to determine the latency tolerance value based upon information obtained from a header of an incoming frame.

23. The storage medium of claim 22, wherein the code is configured to determine the latency tolerance value based upon a calculation of a number of bits in the incoming frame.

24. The storage medium of claim 23, wherein the code is further configured to determine the latency tolerance value based upon a comparison between available space in a receive buffer in the WLAN module and the number of bits in the incoming frame.

25. The storage medium of claim 22, wherein the code is configured to determine the latency tolerance value by identifying a NAP opportunity within the incoming frame based on a determination that an address mismatch exists with the incoming frame.

26. The storage medium of claim 22, wherein the code is configured to determine the latency tolerance value by identifying a NAP opportunity within the incoming frame based on detection of an error associated with the incoming frame.

27. The storage medium of claim 21, further comprising code configured to adjust the latency tolerance value based upon a known delay for a scheduled transmit time of an outgoing frame.

28. The storage medium of claim 21, further comprising code for setting the latency tolerance value to a desired value and code for causing transmission of empty media access control protocol data units (MPDUs) during a delay period associated with the latency tolerance value.

29. The storage medium of claim 21, further comprising code configured to adjust the latency tolerance value by reducing the value to a next lower value that triggers a change in the power management policy.

30. The storage medium of claim 21, further comprising code configured to adjust the latency tolerance value based upon a resolution of a message communicating the latency tolerance value.

* * * * *